3,267,192
METHOD OF MAKING ELASTIC FILAMENTS
Timothy V. Peters, Jr., Barrington, R.I., and A. David Schneider, Scarsdale, N.Y., assignors, by mesne assignments, to Polythane Corporation, Rumford, R.I., a corporation of Delaware
No Drawing. Filed Aug. 22, 1961, Ser. No. 133,029
9 Claims. (Cl. 264—203)

This invention relates to the process of producing elastic filaments derived from segmented polyurethane polymers and more particularly to a process whereby the modulus and elongation properties of these elastic filaments can be conveniently regulated by controlling the degree of covalent cross linking.

The solution method for the production of shaped articles based on the class of segmented polymers commonly referred to as polyurethanes can, in general, conveniently be divided into three phases. The first phase involves the production of a so-called prepolymer which can be prepared by heating a difunctional hydroxyl terminated polymer with a molar excess of an organic diisocyanate to produce a low molecular weight isocyanate-terminated prepolymer. The second phase involves the reaction of the prepolymer with a compound containing, in general, at least two active hydrogens in the presence of a solvent to form a solution containing the resultant polymer or elastomer. The third phase involves the formation of the polymer in a suitable or desired shape such as by extruding the polymer solution through a spinnerette to form filaments or by casting or dip-coating the solution to form self supporting films.

According to this invention, which is particularly concerned with the latter two phases, a relatively low molecular weight difunctional hydroxy terminated polymer such as a polyester glycol or a polyether glycol is reacted with a molar excess of an organic diisocyante to form a prepolymer. The prepolymer, having terminal isocyanate groups, is then reacted is solution with less than the stoichiometric amount of a diamine to form what will hereinafter be referred to for convenience as a semi-polymer solution. An additional amount of an organic diisocyanate is then mixed in with the semi-polymer solution and the mixture is formed into the desired shape and cured. Advantageously the mixture can be extruded or spun through a spinnerette into a bath containing water, or into a heated inert atmosphere containing for example nitrogen and vapors of the solvent used in solution formation, removed, and then cured. By regulating the amount of additional diisocyanate which is added to the semi-polymer solution, the elongation and modulus properties of the elastic filaments are accordingly regulated. With the use of greater amounts of the diisocyanate, the elongation of the elastic filaments is decreased while the modulus is correspondingly increased.

Various difunctional hydroxyl terminated polymers including polyether glycols and polyester glycols can be used to form the prepolymers according to this invention. The molecular weight of the difunctional hydroxyl terminated polymers can advantageously be maintained above about 700 and preferably between about 1,000 and 4,000. Difunctional hydroxy terminated polymers having a molecular weight below about 700 can also be used, but they generally do not result in end products having elasticity as advantageous as from those hydroxy polymers of higher molecular weight. The value of such products produced with hydroxy polymers having lower molecular weight will depend upon the end use of the product and the elasticity desired for that particular use. Generally as the molecular weight of the hydroxy polymer is decreased, the elongation decreases and the modulus increases. The use of a polymer having a molecular weight in an excess of about 4,000 presents considerable difficulties in the subsequent formation of the polymer solution and the transformation of such solutions into suitable and useful products due to difficulties in maintaining acceptable rheological properties in the resulting polymer solutions.

The high molecular weight polyester glycols which can be used according to this invention are those which contain terminal hydroxyl groups. The esters can be prepared by various known methods by reacting diacids, diesters, or diacid halides with glycols. Suitable glycols which can be used to prepare the polyester glycols include polyalkylene glycols such as methylene, ethylene, propylene and butylene glycols. Substituted polyalkylene glycols such as 2,2-dimethyl-1,3-propene diol as well as heterocyclic glycols such as cyclohexanone can also be used. Examples of acids which can be used to prepare the polyester glycols include succinic, adipic, suberic, sebacic, terephthalic, as well as various alkyl and halogen substituted derivatives of the acids. The polyester glycol may for example be prepared by reacting the proper molar ratio of the acids or ester-forming derivatives of the acids with the glycols to produce the high molecular weight polymers. The polyester glycols prepared by reacting 2 mols of polyethylene glycol or polypropylene glycol with 1 mol of adipic acid and then removing the glycol with heat and vacuum until a molecular weight of about 2,000 is reached can advantageously be used to form prepolymers according to this invention.

The polyether glycols which can be used to form the prepolymers according to this invention are polyalkylene ether glycols having terminal hydroxy groups. The polyalkylene ether glycols can be prepared in known manners and are generally prepared by the polymerization of cyclic ethers such as alkylene oxides or from condensation of glycols. The polyalkylene ether glycols are represented by the formula $HO(RO)_nH$ in which R is an alkylene radical and $n$ is an integer sufficiently large so that the polyalkylene glycol has a molecular weight in excess of about 700 and preferably in excess of about 1,000. The polyalkylene glycols can be prepared by copolymerizing mixtures of different alkylene oxides or glycols. Examples of polyalkylene ether glycols which can be used in this invention include polypropylene ether glycol, polytetramethylene ether glycol, polyethylene ether glycol, 1,2-polydimethylethylene ether glycol, polydecamethylene ether glycol, and so forth. Further examples of polyalkylene ether glycols which can be used according to this invention are described in Patent No. 2,492,959.

Various organic diisocyanates can be used to react with the difunctional hydroxy polymers to form the prepolymer. Aromatic, aliphatic, as well as cycloaliphatic diisocyanates or combinations thereof, can be used. Representative diisocyanates includes 4-methyl-m-phenylene diisocyanate, m-phenylene diisocyanate, 4,4'-biphenylene diisocyanate, methylene bis(4-phenylisocyanate), 4-chloro-1,3-phenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate), and 1,5-tetrahydronaphthalene diisocyanate. Arylene diisocyanates, i.e., those in which each of the isocyanate groups is attached directly to an aromatic ring are prefered. In general, they react more rapidly than do the alkylene diisocyanates. The diisocyanates may contain other substituents, although those which are free from reactive groups other than the two isocyanate groups are ordinarily preferred. In the case of the aromatic compounds the isocyanate groups may be attached either to the same or to different rings. Dimers of the monomeric diisocyanates and diisocyanatoaryl)-ureas, such as di(3-isocyanate-4-methylphenyl) urea may also be used.

The patents to Frankenburg No. 2,957,852, Windemuth No. 2,948,691 and Hill No. 2,929,800 further show how the prepolymers can be prepared, as well as the reactants used in their preparation according to this invention.

It has heretofore been customary to prepare a so-called polymer solution by reacting a prepolymer with a diamine in essentially stoichiometric proportions in admixture with a solvent to produce a high molecular weight polymer solution suitable for formation into films, extrusion into a water bath to form filaments and so forth. These solutions generally contain about 15 to 25% by weight polymer.

The method of this invention involves an improvement in the preparation of a polymer solution and the transformation of the polymer solution into elastic products. According to this invention the prepolymer is reacted with a diamine in less than stoichiometric proportions to form a semi-polymer solution. The prepolymer is incompletely reacted and still contains unreacted terminal isocyanate groups. Additional diisocyanate is then mixed in with the semi-polymer solution, the mixture is either dry spun or wet spun, i.e., either extruded into a heated inert atmosphere containing solvent vapors or extruded into a liquid bath, and heat cured. In the curing step the free isocyanate groups are caused to react with urethane hydrogens along the semipolymer chain thus resulting in covalent crosslinks.

The amount of diamine that can be used to form the semi-polymer solution can be varied considerably depending on a number of factors such as the particular diamine used to react with the prepolymer, the reactants used to form the prepolymer, the properties desired to be possessed by the end products and so forth. These and other factors will be apparent to those skilled in the art and the exact amount of diamine that can most advantageously be used to prepare the semi-polymer can be readily determined by those skilled in the art by routine experimentation. Generally, the reaction of the prepolymer with the diamine in a molar ratio of about 5:4 is advantageous. As a 1:1 ratio is approached, the viscosity of the solution increases and requires the use of additional solvent which results in a decrease of the polymer solids content of the solution. With many intermediates it is not possible, as a practical matter, to extrude, or otherwise form, a prepolymer into a final product having desirable and useable elastic products and it is therefore necessary to use a sufficient amount of a diamine to form a semi-polymer solution having suitable characteristics for formation into useful elastic products. As the molar ratio of prepolymer to diamine is increased, polymer solutions tend to lose their advantageous extrusion characteristics and the formation of products therefrom become more difficult. The amount of diamine reacted with the prepolymer should generally be selected on the basis of the extrudability of the semi-polymer solution and the amount of solvent required to produce an extrudable semi-polymer solution.

The gradual addition of the diamine to the prepolymer solution results in the gradual increase in the viscosity of the solution. The extent and rate of the viscosity increase will depend to a great degree on the particular diamine being used to form the semi-polymer. It is advisable to add sufficient diamine to increase the viscosity of the solution to at least about 50 poises to obtain a solution which, when mixed in with additional diisocyanate, can be easily extruded. Generally, it is more advantageous to extrude solutions having viscosities between about 100 to 500 poises.

The amount of additional diisocyanate which can be added to the semi-polymer solution can be readily varied in order to regulate the elongation and modulus characteristics of the resulting elastic filaments. As shown in the following examples, when the higher amounts of the additional diisocyanate are used, the elongation of the resulting elastic filaments are decreased while the modulus is correspondingly increased. The actual amount of additional diisocyanate can vary considerably depending upon the properties desired in the final product and can be readily determined by routine experimentation. Additional diisocyanate has been advantageously employed in amounts equivalent to from about 0.2 to 1 mol of diisocyanate to 1 mol of prepolymer used. Of course, considerably higher or lower proportions can also be used.

The diisocyanate which is used can be any of those described above which are used in the formation of the prepolymer. The diisocyanate which is employed in the preparation of the prepolymer can be the same or different from the diisocyanate which is added to the semi-polymer.

Various primary and secondary diamines can be used to form the semi-polymers according to this invention including aliphatic, allocyclic and inorganic diamines. Generally, the same diamines can be used as have previously been known to be useful in the prior process in which substantially a stoichiometric amount of diamine is reacted with the prepolymer. The particular diamines which can be used according to this invention will thus be apparent to those skilled in the art. Specific examples of a number of diamines which can be used are hydrazine, ethylene diamine, piperazine, 1,4-diamine-2-methyl piperazine, 1,4-diamine-2,5-dimethyl piperazine, methylimino bis propylamine, etc. It should also be apparent to those skilled in the art that combinations of two or more diamines may be used in the semi-polymer formation step.

Various solvents can be used to form the semi-polymer solutions, as will be apparent to those skilled in the art, such as dimethyl formamide, dimethyl sulfoxide, dimethyl acetamide, etc. Advantageously, a ratio of 1:1 of the solvent to the semi-polymer can be employed.

As readily ascertained by one skilled in the art, the removal of the solvent from the semi-polymer-diisocyanate mixture is advantageously carried out by extruding the mixture into a bath containing water, kerosene, or any other suitable medium which is substantially non-reactive with the components of the mixture and forms solutions with the solvent used in prepolymer formation. Although, as is well known, water is reactive with isocyanates, it can be used in the bath as a result of its rather low reaction rate with isocyanate and slow diffusion into the filaments. Alternatively, the mixture can be dry spun in order to remove the solvent.

The bath into which the mixture of the semi-polymer and the diisocyanate can be extruded or dipped can be composed of water, for example, or more advantageously, a water-solvent solution. The bath into which the mixture is extruded or dipped builds up its solvent content during the process due to extraction of the solvent from the mixture but this additional solvent can be removed during the process. The use of a bath also containing solvent facilitates solvent recovery and the solvent is generally continuously removed from the bath if a solvent-water bath is employed to maintain the solvent content at a desirable level, e.g. 40–60% solvent.

In the formation of filaments, the extrusion speeds obtainable will depend upon the bath temperature, the length of the bath, etc. Extrusion speeds of 150 feet per minute and higher have been obtained using a bath approximately 6 feet in length. The 150 feet per minute extrusion speed referred to above is not limiting since higher extrusion speeds can be obtained. The above extrusion speed is advantageously carried out with a mixture of diisocyanate and semi-polymer solution containing approximately 50% solids, however, such mixtures can be prepared according to this invention containing solids in excess of 50%.

The filaments can be led through the bath by means of suitable guides and then into a drying chamber where the filaments are cured. The temperature at which the chamber is maintained and the length of time in which the filaments are exposed to this temperature will vary depending upon the particular operating conditions employed, the reactants, the proportion of the reactants, and so forth. The most suitable time-temperature relationship for each curing operation is a matter which can readily be determined by one skilled in the art. For example, under the conditions described in Example 1 below, it was advantageous to expose the filaments to a temperature of 95° C. for 10 hours. In the following illustrative examples, parts are by weight.

*Example 1*

1200 parts of a poly(propylene adipate) glycol having a molecular weight of about 2000 were heated to 60° C. in an inert atmosphere and then thoroughly mixed with 303 parts of methylene bis(4-phenyl isocyanate). The mixture was then heated to 100° C., held at this temperature for 90 minutes, cooled to 50° C. and diluted with 1500 parts of dimethylsulfoxide to a yield of 50% solution of an isocyanate-terminated prepolymer. The prepolymer solution was then rapidly stirred and a 10% by weight solution of anhydrous hexamethylene diamine in dimethylsulfoxide was slowly added until the solution reached a viscosity of 200 poises. 100 parts of methylene bis(4-phenylisocyanate) was then added and the resulting mixture degassed, and extruded through a spinnerette containing 10 holes (each 0.004 inch in diameter) into a bath containing dimethylsulfoxide and water in approximately equal amounts. The semi-plastic fibers thus formed were rinsed with water and then heat cured at 95° C. for 10 hours. The cured fibers had an elongation of 350% and a modulus at 200% equal to 2200 lbs./sq. in.

*Example 2*

1200 parts of a poly(propylene adipate) glycol having a molecular weight of about 2000 were heated to 60° C. in an inert atmosphere and then thoroughly mixed with 303 parts of methylene bis(4-phenyl isocyanate). The mixture was then heated to 100° C., held at this temperature for 90 minutes, cooled to 50° C. and diluted with 1500 parts of dimethylsulfoxide to a yield of 50% solution of an isocyanate-terminated prepolymer. The prepolymer solution was then rapidly stirred and a 10% by weight solution of anhydrous hydrazine in dimethylsulfoxide was added slowly until the solution reached a viscosity of 200 poises. 100 parts of tolylene diisocyanate was then added and the resulting mixture degassed, and extruded through a spinnerette containing 10 holes (each 0.004 inch in diameter) into a water bath, removed and then heated treated at 95° C. for 36 hours. The cured fibers had an elongation of 400% and a modulus at 300% equal to 2850 lbs./sq. in.

*Example 3*

The procedure of Example 2 was followed except that ethylene diamine was employed instead of the hydrazine.

The cured fibers had an elongation of 475% and a modulus at 300% equal to 3,100 lbs./sq. in.

We claim:
1. The method of preparing synthetic elastic copolymer filaments which comprises heating a difunctional hydroxyl terminated polymer having a molecular weight above about 700 with an organic diisocyanate to produce a low molecular weight isocyanate terminated prepolymer, reacting the resulting isocyanate terminated prepolymer with less than the stoichiometric amount of a diamine in admixture with a solvent for the reactants and the resulting reaction product to form a semi-polymer solution containing terminal isocyanate groups, adding thereto an organic diisocyanate, extruding the semi-polymer solution containing the added diisocyanate into a bath to extract the solvent and form filaments, removing the filaments from the bath and curing said filaments.

2. The method of claim 1 in which the hydroxyl terminated polymer is a poly(alkylene oxide) glycol.

3. The method of claim 1 in which the diisocyanate which is added to the semi-polymer is methylene bis(4-phenyl-isocyanate).

4. The method of claim 1 in which the amount of diisocyanate which is added to the semi-polymer is equivalent to from about 0.2 to 1 mol of diisocyanate for each mol of the prepolymer.

5. The method of claim 1 in which the diamine used to react with the prepolymer to form the semi-polymer is hydrazine.

6. The method of claim 1 in which the diisocyanate which is added to the semi-polymer is tolylene diisocyanate.

7. The method of claim 1 in which the semi-polymer solution containing the added diisocyanate is extruded into a water bath.

8. The method of claim 7 in which the filaments are removed from the water bath and heat cured at about 95° C. for about 10 hours.

9. The method of claim 7 in which the amount of solvent in the water bath does not exceed about 60% by weight of the solvent-water bath.

References Cited by the Examiner

UNITED STATES PATENTS

| | | |
|---|---|---|
| 2,625,531 | 1/1953 | Seeger. |
| 2,760,953 | 8/1956 | Seeger. |
| 2,829,984 | 4/1958 | Yaeger. |
| 2,905,582 | 9/1959 | Coleman. |
| 2,929,800 | 3/1960 | Hill. |
| 3,036,878 | 5/1962 | Polansky. |
| 3,180,854 | 4/1965 | Schneider et al. |

ALEXANDER H. BRODMERKEL, *Primary Examiner.*

HAROLD M. BURSTEIN, *Examiner.*

M. C. JACOBS, A. L. LEAVITT, *Assistant Examiners.*